US006629150B1

United States Patent
Huded

(10) Patent No.: US 6,629,150 B1
(45) Date of Patent: Sep. 30, 2003

(54) PLATFORM AND METHOD FOR CREATING AND USING A DIGITAL CONTAINER

(75) Inventor: Ashok V. Huded, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/336,002

(22) Filed: Jun. 18, 1999

(51) Int. Cl.[7] .............................................. G06F 15/16
(52) U.S. Cl. ......................................... 709/247; 707/4
(58) Field of Search ................................ 709/217, 236, 709/247; 705/75, 76, 67, 77; 707/204, 4; 713/156, 193

(56) References Cited

U.S. PATENT DOCUMENTS

| | | | | |
|---|---|---|---|---|
| 5,191,613 A | * | 3/1993 | Graziano et al. | 713/176 |
| 5,218,637 A | | 6/1993 | Angebaud et al. | |
| 5,373,561 A | | 12/1994 | Haber et al. | |
| 5,473,692 A | | 12/1995 | Davis | |
| 5,568,552 A | | 10/1996 | Davis | |
| 5,712,914 A | | 1/1998 | Aucsmith et al. | |
| 5,757,919 A | | 5/1998 | Herbert et al. | |
| 5,870,754 A | * | 2/1999 | Dimitrova et al. | 707/104.1 |
| 5,907,619 A | | 5/1999 | Davis | |
| 5,937,411 A | * | 8/1999 | Becker | 707/103 |
| 5,983,295 A | * | 11/1999 | Cotugno | 710/74 |
| 5,983,348 A | * | 11/1999 | Ji | 713/200 |
| 6,047,318 A | * | 4/2000 | Becker et al. | 709/217 |
| 6,067,416 A | * | 5/2000 | Fraser | 717/178 |
| 6,088,747 A | * | 7/2000 | Cotugno et al. | 710/74 |
| 6,098,056 A | * | 8/2000 | Rusnak et al. | 705/75 |
| 6,170,058 B1 | * | 1/2001 | Kausik | 713/193 |
| 6,195,794 B1 | * | 2/2001 | Buxton | 717/11 |
| 6,199,072 B1 | * | 3/2001 | Jian et al. | 707/204 |
| 6,256,668 B1 | * | 7/2001 | Slivka et al. | 709/220 |
| 6,272,674 B1 | * | 8/2001 | Holiday, Jr. | 717/1 |
| 6,282,535 B1 | * | 8/2001 | Pham et al. | 707/4 |
| 6,286,051 B1 | * | 9/2001 | Becker et al. | 709/236 |
| 6,311,273 B1 | * | 10/2001 | Helbig et al. | 713/200 |
| 6,314,468 B1 | * | 11/2001 | Murphy et al. | 709/236 |
| 6,415,385 B1 | * | 7/2002 | Cotugno et al. | 713/716 |

FOREIGN PATENT DOCUMENTS

| EP | 892521 A2 * | 1/1999 | H04L/9/32 |
|---|---|---|---|

OTHER PUBLICATIONS

Johnson, The bean box: Sun;s Java beans test container, Sep. 1997, javaworld.com, 6 pages.*
Zheng "Universal Hash Function in Randomness Extraction and Message authentication" 7/98, ieee.org, 6 pages.*
SSH X.509 certificates tools white paper, 03/99, version 2, pp. 1–15.*
Smith, "Securing the Future of Java" 04/97, Javaworld, 3 pages.*
Jaworski, JAVA 1.1, 1997, Samsnet, second edition, 24 pages.*
Dell et al., "Manifest formal", 3/99, Sun Microsystems Inc., 7 pages.*
Tackett et al., "Using Linux", 1998, forth edititon, 33 pages.*

* cited by examiner

*Primary Examiner*—B. Jaroenchonwanit
(74) *Attorney, Agent, or Firm*—Blakely, Sokoloff, Taylor & Zafman LLP

(57) ABSTRACT

A method for producing and verifying the integrity and authenticity of a digital container. The digital container includes digital information in the form of data files or other digital containers along with security attributes associated with the digital information. In one embodiment, the production of the digital container comprises (i) producing a container archive by compressing a combined result of digital information and a signed archive manifest associated with the digital information and (ii) compressing a combined result of container archive and a signed container manifest associated with the container archive. This produces the digital container for use in preventing unauthorized observation or manipulation of the contents of the data files for example.

16 Claims, 7 Drawing Sheets

PLATFORM AND METHOD FOR CREATING AND USING A DIGITAL CONTAINER

BACKGROUND

1. Field

The present invention relates to the field of data security. More particularly, this invention relates to a platform and corresponding method for preventing digital information from unauthorized observation, manipulation and/or distribution by users, applications, and machines.

2. General Background

Due to advances in digital processing technology and growing usage of networks and the Internet the distribution of digital information is increasing in popularity. In general, one consumption model of digital information involves the sale of software applications, software games, videos, still images, audio recordings, text documents and/or other forms of digital information. For example, software vendors are using the Internet to sell and/or provide software in a digital format to its customers upon credit card confirmation. Other distribution models include pay-per-view, rent-to-own, subscriptions and the like.

To protect the digital information, software vendors and other information providers have relied on encryption and decryption technology. While this technology protects the digital information during distribution, it is unable to protect the digital information once received by an open, programmable digital platform (e.g., computer, set-top box, etc.) of the customer. For example, the digital information cannot be prevented from being observed by unauthorized users, manipulated (e.g., copied, altered, etc.) by a malicious program during playback, or even replicated for subsequent distribution by customers themselves. The reason is that encryption and decryption technology does not have any conditional access mechanisms to enforce rules of usage associated with the decrypted digital information.

It is appreciated that the inability to protect the digital information once in possession of the customer has greatly impeded the distribution of digital content that has intellectual and commercial value associated with it. Therefore, it would be desirable to create a platform and method for protecting digital information by binding security attributes to the digital information itself.

SUMMARY

Briefly, in one embodiment, the invention relates to a platform comprising a processor and a memory device. The memory device includes code executable by the processor. When executed, the code produces a container archive by compressing a combined result of digital information and a signed archive manifest associated with the digital information. The code also comprises a combination of a signed container manifest and the container archive forming a digital container.

BRIEF DESCRIPTION OF THE DRAWINGS

The features and advantages of the present invention will become apparent from the following detailed description in which.

DETAILED DESCRIPTION

Figure 1:
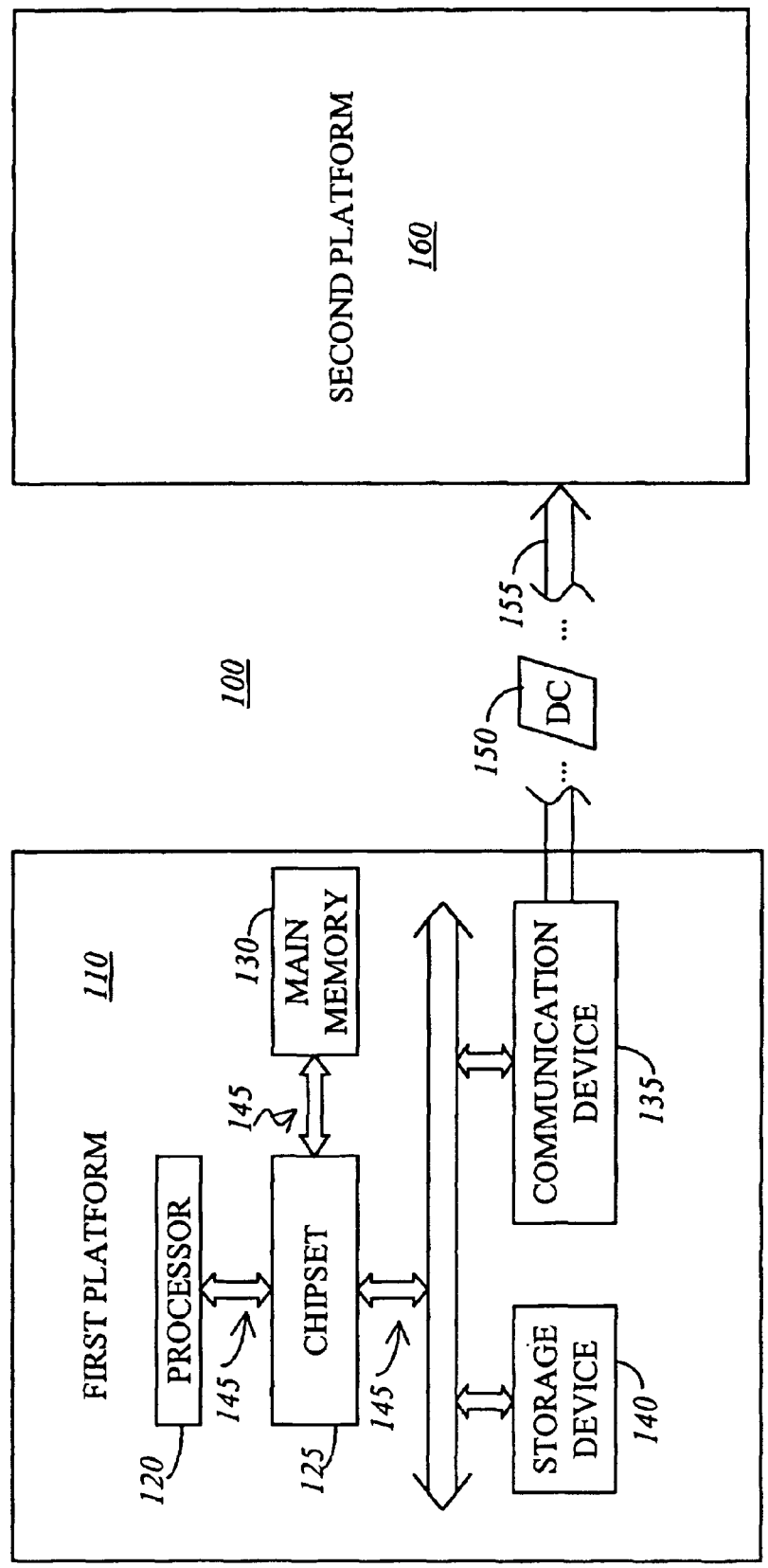
FIG. 1 is an illustrative block diagram of an embodiment of a distribution system.

The present invention relates to a platform and corresponding method to create and verify a digital container to prevent digital information from unauthorized observation, manipulation and/or distribution. A "digital container" comprises information combined with security attributes to collectively act as a data file. "Information" is generally defined as (i) data in the form of programs, video, images, audio, text, or any combination thereof, and/or (ii) control such as Internet Protocol (IP) commands, identifiers and the like. This information resides in a digital format. A "data file" is information placed in any format readable or executable by a platform such as an executable (.exe) file, a text file inclusive of a uniform resource locator (URL) and the like. A "security attribute" is information to restrict usage of accompanying digital information. Examples of security attributes include a digital signature and a digital certificate.

In the following description, certain terminology is used to describe characteristics of the present invention as well as its functionality. For example, a "platform" includes, but is not limited or restricted to a computer (e.g., a laptop, desktop, hand-held, server, mainframe, etc.), communication equipment (e.g., telephone, telephone with video display, etc.), a set-top box (e.g., cable box, network computer, etc.) or any other electronic device. A "communication link" is defined as a medium to transfer information from one location to another. Examples of a communication link include, but are not limited or restricted to electrical wire, optical fiber, cable, wireless channel(s) established using infrared (IR) or radio frequency (RF) signaling, a private local area network, a wide area network or even the Internet.

With respect to cryptographic functionality, a "key" is information used as a parameter by a cryptographic function to encrypt, decrypt and/or alter the format of digital information. Herein, each key is sized to be 160-bits in length, although any bit size may be used. The term "secure" (and any other tense or form thereof) indicates a state where it is virtually computationally infeasible for an unauthorized individual to gain access to digital information or other data in a plain text format.

A "digital signature" includes digital information signed with a private key of its signatory in accordance with a digital signature function. For clarity sake, one type of digital signature function described herein is a Digital Signature Algorithm (DSA) set forth in a 1998 publication entitled "Federal Information Processing Standards Publication 186-1" (Dec. 15, 1998). The digital signature is used to ensure that the digital information has not been illicitly modified after being digitally signed. This digital information may be provided in its entirety, in part, or after undergoing a one-way hash function.

A "one-way hash function" includes a function, mathematical or otherwise, that converts information from a variable-length to a fixed-length (referred to as a "message digest"). The term "one-way" indicates that there does not readily exist an inverse function to recover any discernible portion of the original information from the fixed-length digest. Examples of a hash function include MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

In addition, a "digital certificate" includes digital information used to authenticate a sender of information. For example, a digital certificate includes information concerning a person or entity being certified that is encrypted with the private key of a certification authority. Normally, the public key of the certification authority is widely available. Examples of a "certification authority" include an original equipment manufacturer (OEM), a software vendor, a trade association, a governmental entity, a bank or any other trusted business or person.

Referring to FIG. 1, an illustrative block diagram of an embodiment of a distribution system 100 is shown. In this embodiment, distribution system 100 comprises a first platform 110 and a second platform 160. First platform 110 comprises a processor 120 (e.g., a microprocessor, a microcontroller, a state machine, etc.), a chipset 125, a first memory device (e.g., main memory) 130, a communication device 135 (e.g., a modem card, network interface card, etc.) and a second (peripheral) memory device 140 (e.g., a hard disk, a compact disk "CD" readable by a CD player or drive, a digital video disk "DVD" readable by a DVD drive, etc.). These devices 120, 125, 130, 135 and 140 are coupled together through buses 145. As shown, main memory 130 includes software coded to produce a digital container (DC) 150 stored in either main memory 130 or memory device 140. It is contemplated, however, that hardware or firmware may be used to produce digital container 150 in lieu of software as shown.

As shown, platforms 110 and 160 are coupled together through a communication link 155 that enables digital container 150 to be delivered to second platform 160. Digital container 150 is delivered to second platform 160 via communication link 155 either (1) when a continuous connection is established and maintained with first platform 110, or (2) during periodic connections with first platform 110. Independent of the delivery technique the method allows the second platform 160 to perform integrity and/or authentication checks on the digital container 150.

Figure 2:
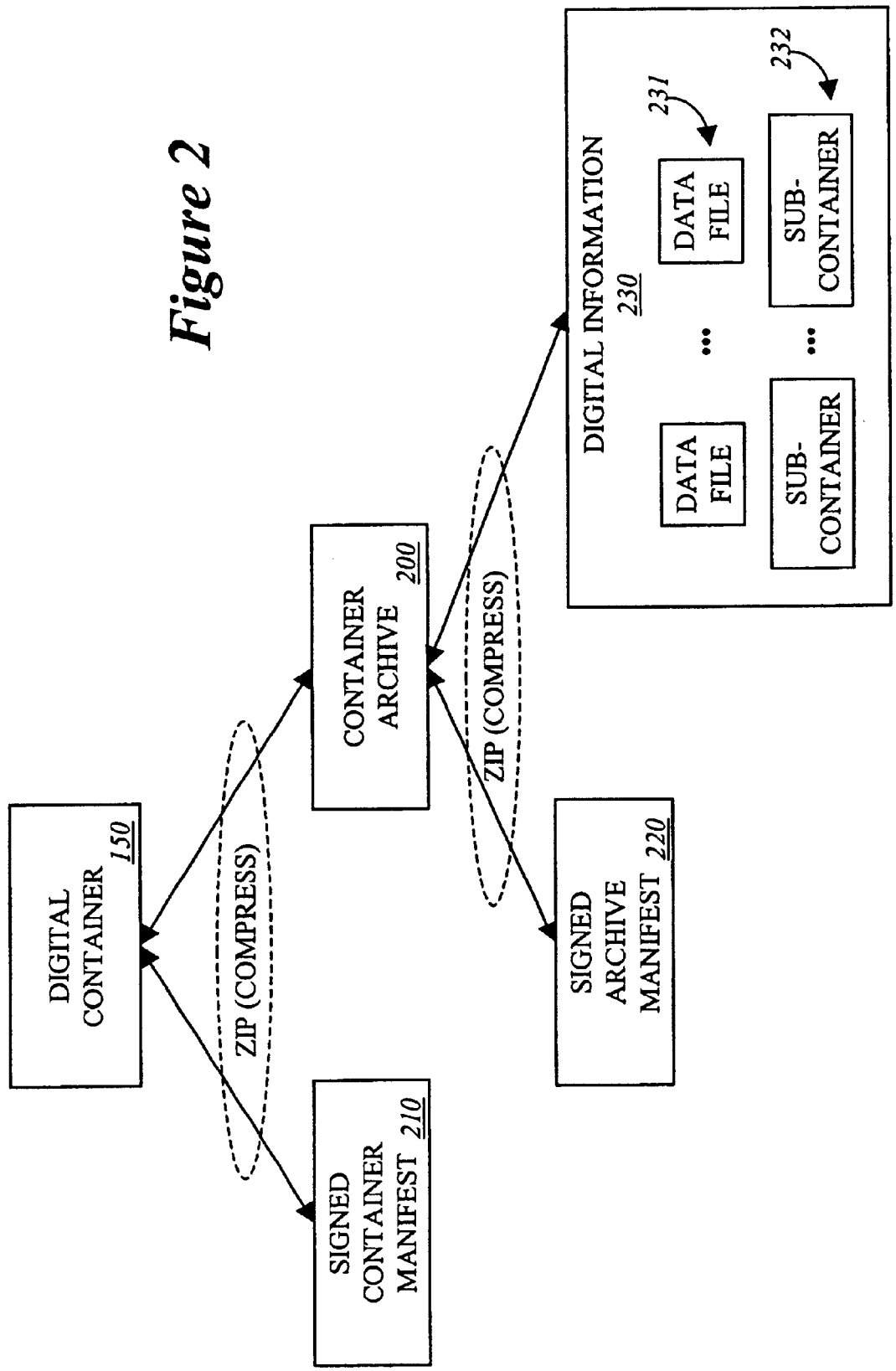
FIG. 2 is an illustrative block diagram of an embodiment of the general operations performed by a first platform of the distribution system of FIG. 1 to produce a digital container.

Referring now to FIG. 2, an illustrative block diagram of the operations performed by first platform 110 of FIG. 1 to produce digital container 150 is shown. In this embodiment, digital container 150 comprises a container archive 200 and a signed container manifest 210 to verify the integrity of container archive 200 and to authenticate its provider. Container archive 200 and signed container manifest 210 are separately compressed (e.g., zipped) and placed into a single file, namely digital container 150. This compression may be a zip operation performed through a variety of zip programs such as WINZIP by Microsoft Corporation of Redmond, Washington for example. The contents of both container archive 200 and signed container manifest 210 may be recovered through decompression (e.g., "unzipping" digital container 150).

Container archive 200 is a "zip" file formed from a signed archive manifest 220 and digital information 230. As shown, digital information 230 includes one or more data file(s) 231 or subcontainer(s) 232. A "subcontainer" is a digital container that was previously created using the same protocol as discussed below. This allows digital containers to be nested thus providing a flexible and commercially viable model to distribute digital content.

Figure 3:
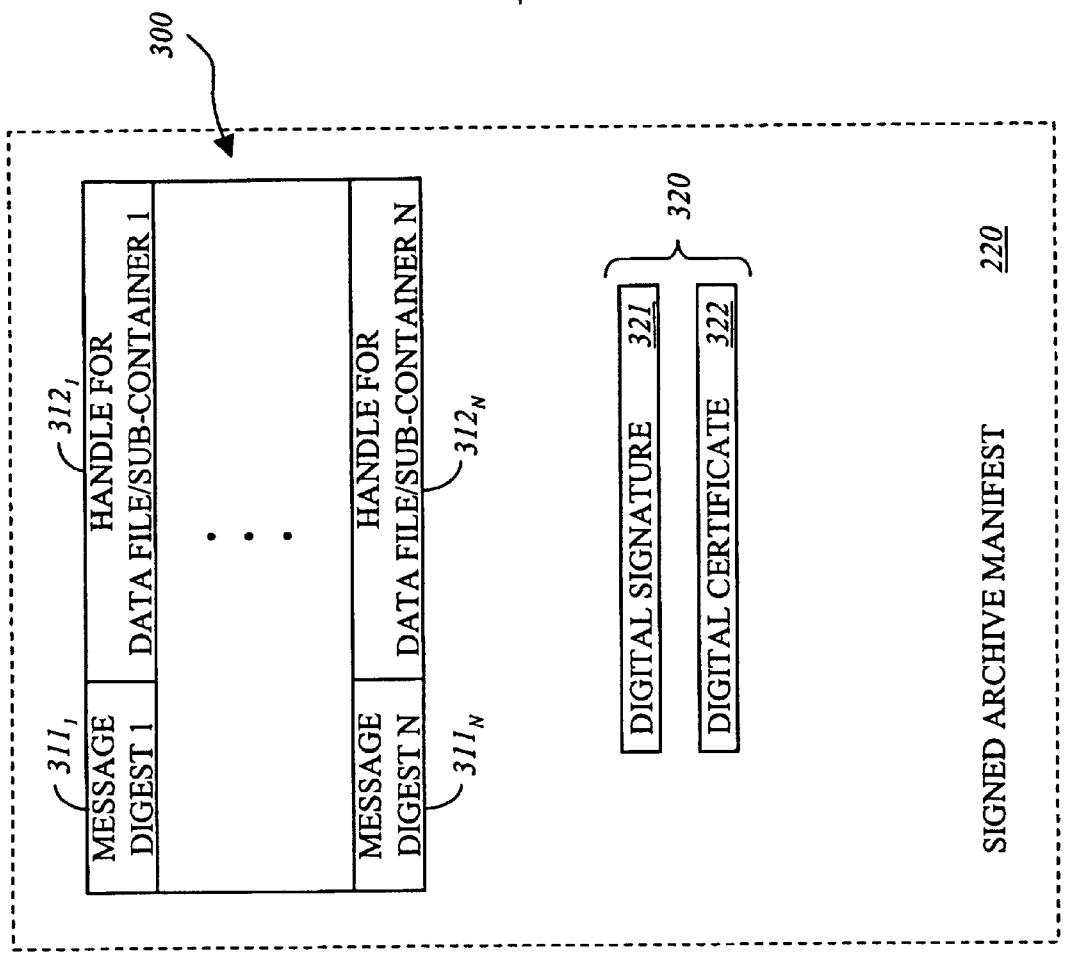
FIG. 3 is an illustrative block diagram of an embodiment of a signed archive manifest placed in a container archive of FIG. 2.

As shown in FIG. 3, signed archive manifest 220 includes a listing (table) 300 that enumerates all N data files or subcontainers associated with digital information 230 of FIG. 2. More particularly, message digests $311_1$–$311_N$ and corresponding, assigned file names (or handles) $312_1$–$312_N$ (where "N" is a positive whole number) are enumerations for the N data files and/or subcontainers associated with digital information 230 of FIG. 2. Signed archive manifest 220 also includes a digital signature 321 and a digital certificate 322. Together, message digests $31_1$–$31_N$, digital signature 321 and digital certificate 322 constitute the security attributes associated with digital information 230 of FIG. 2 in its entirety.

Figure 4:
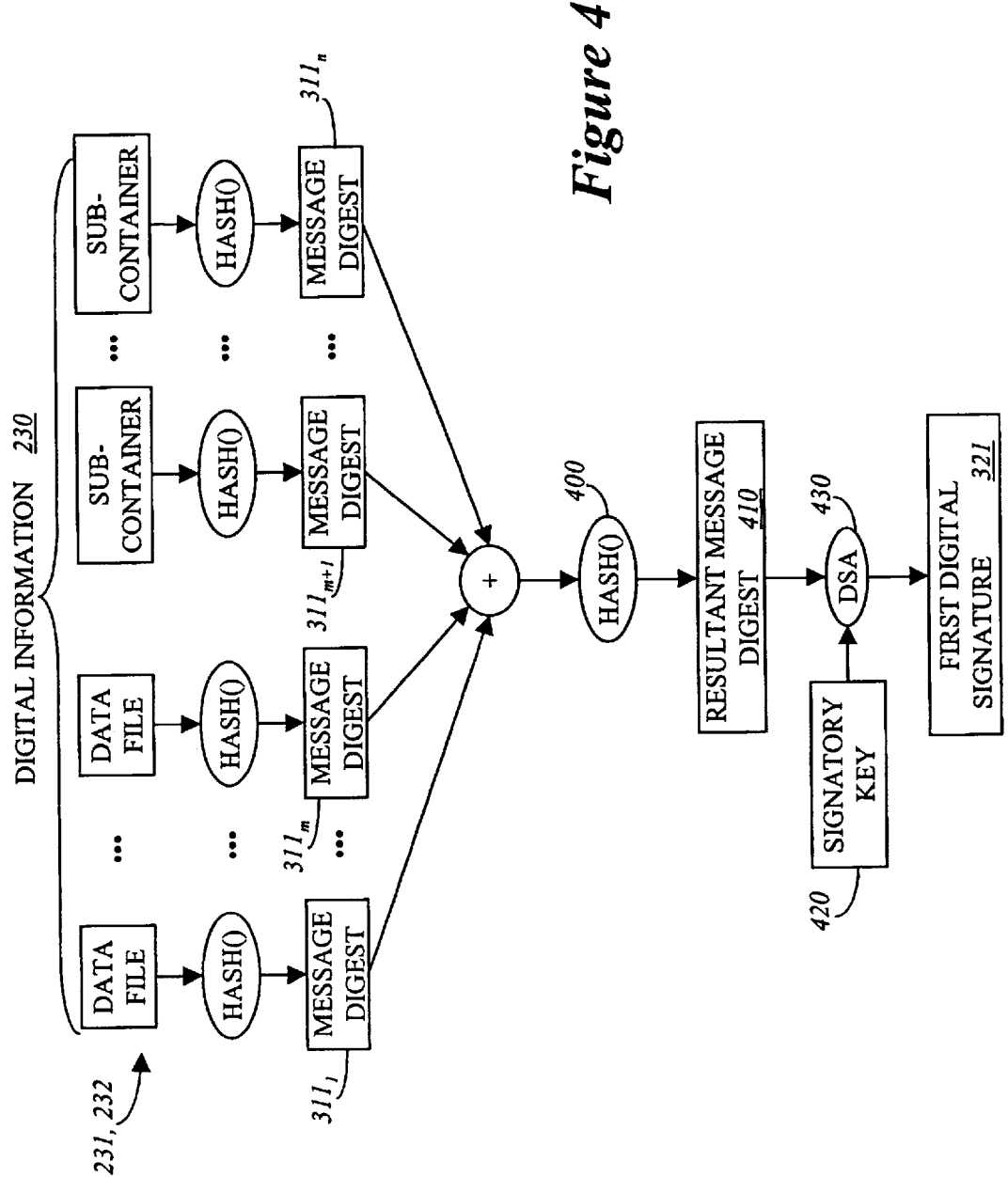
FIG. 4 is an illustrative block diagram of an embodiment of a protocol performed by the first platform of the distribution system of FIG. 1 to produce the first digital signature loaded into the signed archive manifest of FIG. 3.

Referring now to FIG. 4, an embodiment of a protocol followed to produce a first digital signature 321 is shown. Digital information 230 that is associated with the handles to data file(s) and/or subcontainer(s) $312_1$–$312_N$, undergoes a one-way hash function to produce message digest $311_1$–$311_N$. These message digests $31_1$–$311_N$ are concatenated and are processed by a selected one-way hash function 400 to produce a resultant message digest 410. Thereafter, resultant message digest 410 is digitally signed by a signatory key 420 to produce first digital signature 321. In this embodiment, the digital signaturing process is performed in accordance with a digital signature function 430 such as DSA for example. Signatory key 420 is associated with a person or entity having access to first platform 110 such as, for example, a software vendor or other type of information provider.

Once produced, first digital signature 321 along with message digests $311_1$–$311_N$, assigned handles $312_1$–$312_N$ (see FIG. 3) and the digital certificate 322 comprise a signed archive manifest 220. By employing first digital certificate 322 within signed archive manifest 220, the integrity of digital information 230 can be verified before usage or transmission to the customer as described in FIGS. 7–8. Digital certificate 322 that is present inside the signed archive manifest 220 is used only to verify the integrity of digital information 230. The externally provided (or customer supplied) digital certificate is used to verify both the integrity and authenticity of the originator of digital information 230.

Figure 5:
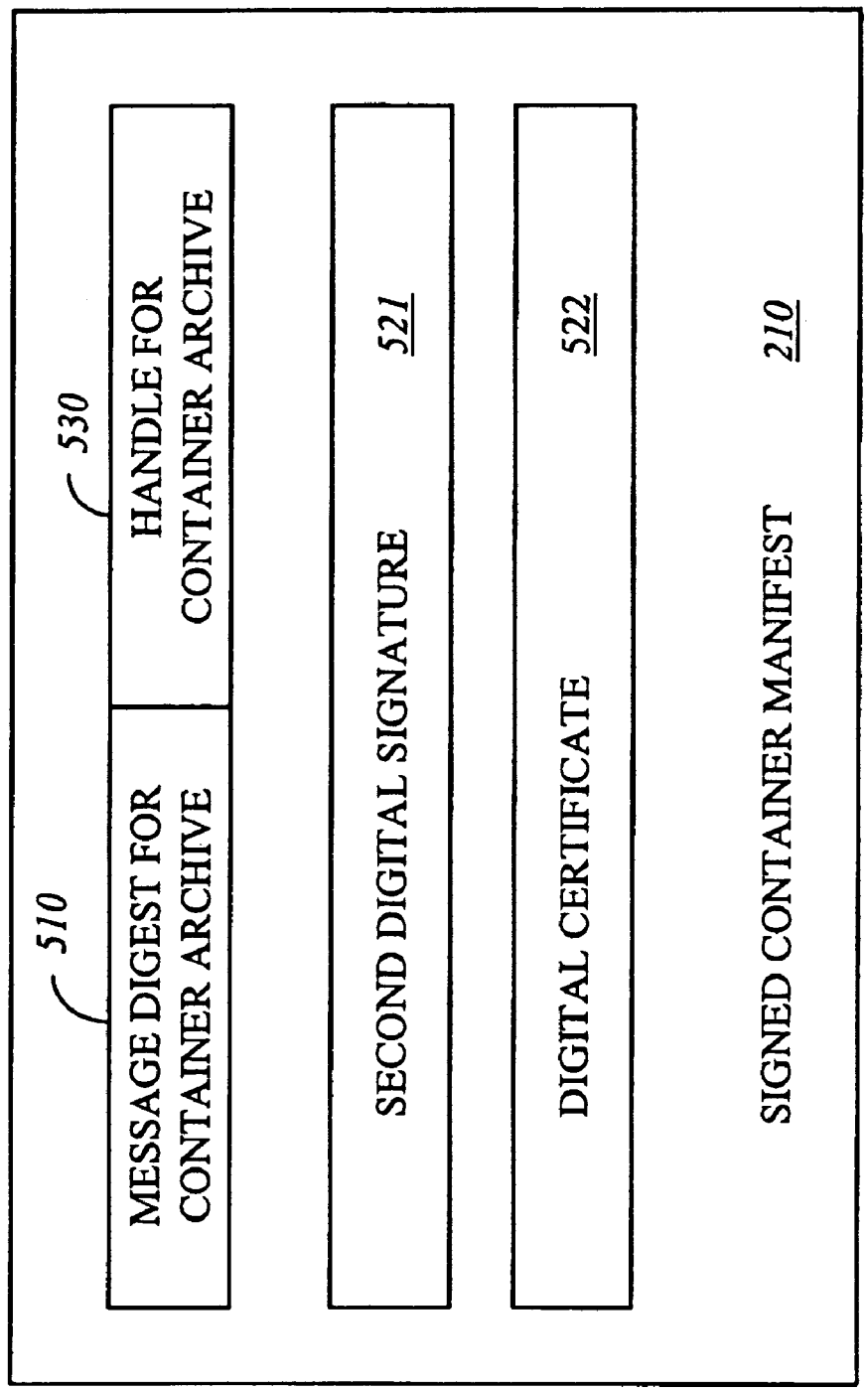
FIG. 5 is an illustrative block diagram of an embodiment of a signed container manifest placed in a digital container of FIG. 2
Figure 6:
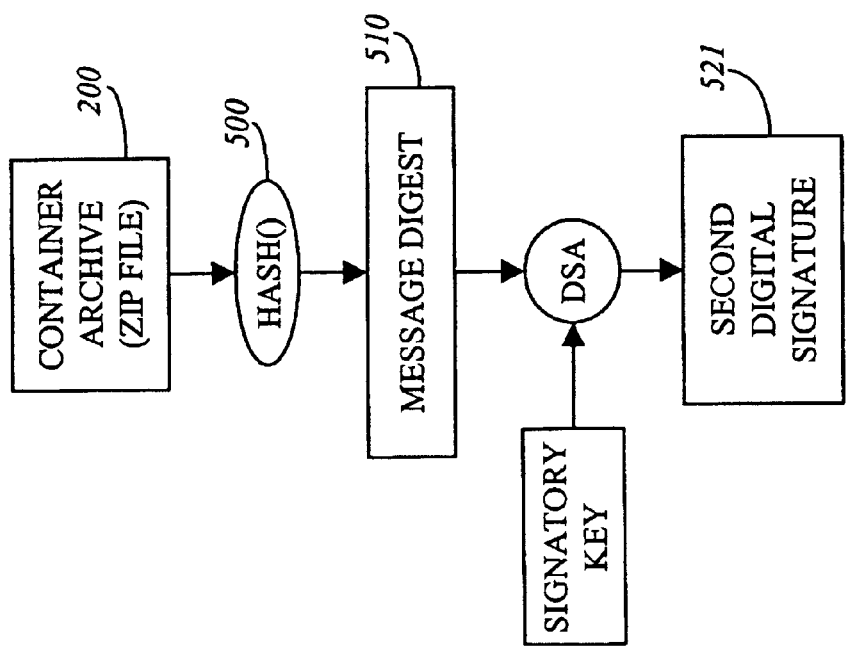
FIG. 6 is an illustrative block diagram of an embodiment of a protocol performed by the first platform of the distribution system of FIG. 1 to produce the second digital signature loaded into the signed container manifest of FIG. 5.

Next, as shown in FIG. 2, signed archive manifest 220 and digital information 230 are zipped (or compressed) together to produce a single zip file, namely container archive 200. The contents of container archive 200, namely the zip file, undergo a one-way hash function 500 to produce a message digest 510 as shown in FIG. 6. Message digest 510 is digitally signed by the provider of digital container 150 to produce a second digital signature 521. Thereafter, an assigned handle 530 associated with container archive 200, second digital signature 521 and the second digital certificate 522 are combined together to produce signed container manifest 210 as shown in FIG. 5. Finally the signed container manifest 210 and the container archive 200 are zipped (or compressed) together to produce digital container 150 as shown in FIG. 2.

In one embodiment, the digital certificate 322 and the digital certificate 522 include a public key of an originator of digital information 230, perhaps the signatory of first digital signature 321 and the second digital signature 521 for example. As a result, digital container 150 can be verified and authenticated as described below.

Figure 7:
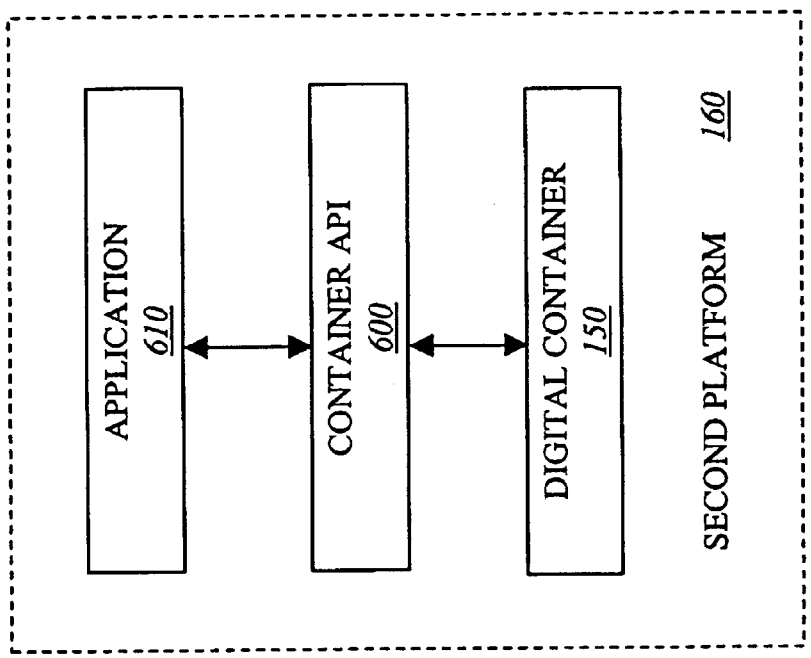
FIG. 7 is an illustrative block diagram of an embodiment of the general operations performed by a second platform of the distribution system of FIG. 1 to recover digital information in the digital container of FIG. 2.

Referring now to FIG. 7, an illustrative block diagram of second platform 160 is shown. In this embodiment, second platform 160 comprises a container advanced programmable interface (API) 600. Container API 600 enables an application 610 (e.g., a browser, an installation application, etc.) running on second platform 160 of FIG. 1 to securely access digital information contained in digital container 150 stored in main memory and/or a peripheral memory device of second platform 160. Container API 600 provides a variety of services to application 610, some of these services include: (a) verification of the integrity of the digital container; (b) authentication of the provider of the digital container; (c) navigation for subcontainers (nested digital containers); (d) export information pertaining to the digital container (e.g., content list, verification status, signer certificate); (e) multiple client support (e.g., multiple client applications can operate on a single digital container; and (f) multiple package support (e.g., a single client can operate on multiple digital containers).

Figure 8:
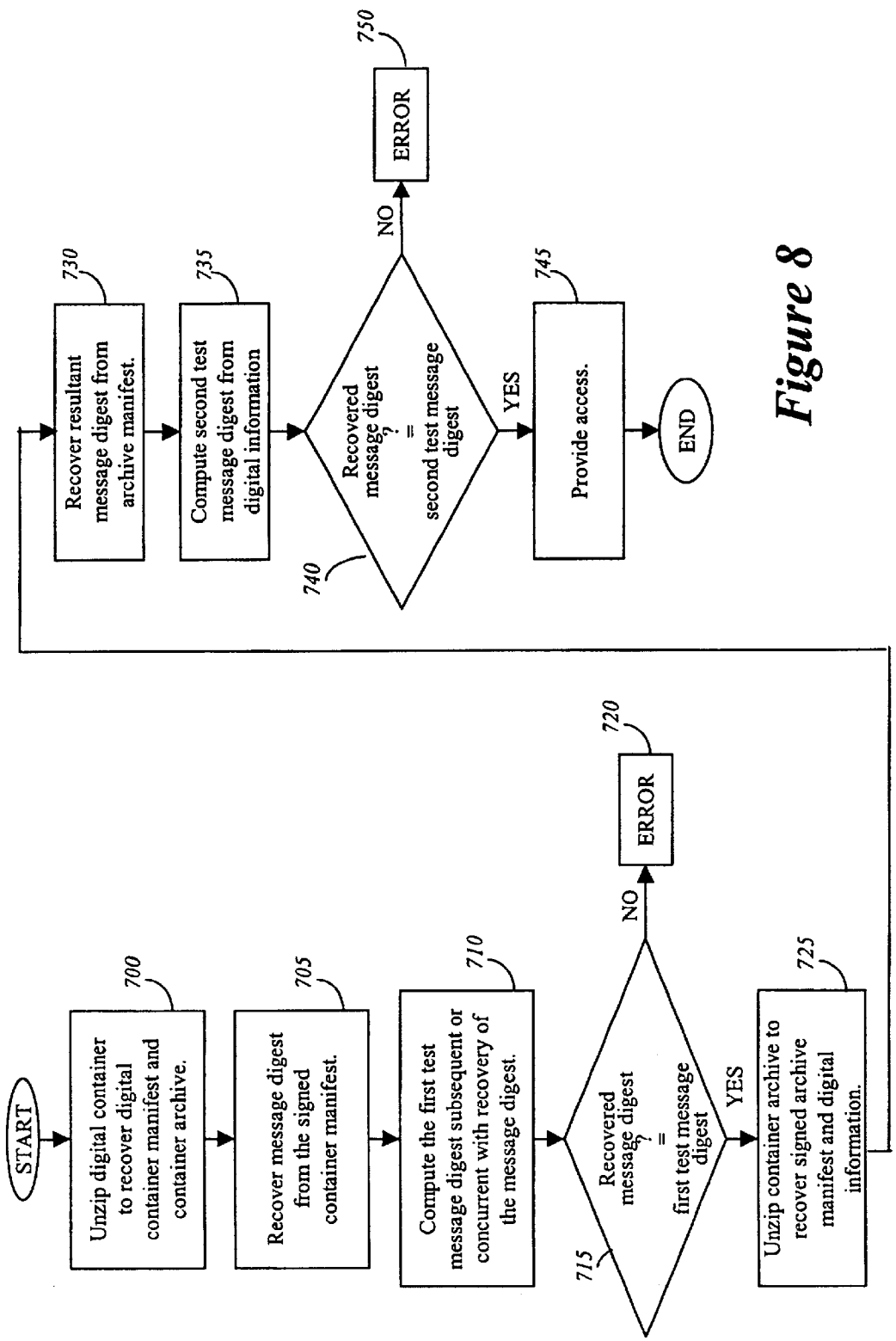
FIG. 8 is an illustrative block diagram of an embodiment of a protocol performed by the second platform of the distribution system of FIG. 1 to verify the integrity and authenticity of the digital information before processing.

In particular, as shown in FIG. 8, verification of the integrity of digital container involves a dual signature comparison operation. First, digital container 150 is unzipped (or decompressed) to recover signed container manifest and container archive (block 700). From signed container manifest, message digest is recovered using the public key of the signatory of the second digital signature (block 705). The container archive is then processed through a one-way hash function, identical to the hash function used to originally produce message digest, to compute a first test message digest (block 710). The first test message digest is compared with recovered message digest (block 715). If a match is not detected, an error is reported and the container archive cannot be opened (block 720). However, if a match is detected, a follow-up operation is performed.

Container archive is unzipped (or decompressed) to recover signed archive manifest and digital information, herein N data files and/or subcontainers (block 725). From the signed archive manifest, the resultant message digest 410 of FIG. 4 is recovered using the public key of the signatory of the first digital signature (block 730). Next, a second test message digest is computed from the concatenation of message digests $311_1$–$311_N$ associated with the signed archive manifest and subsequently processed using the same one-way hash function that was used to compute the resultant message digest (block 735). Thereafter, the computed second test message digest is compared to the resultant message digest (block 740). If the comparison is deemed successful, it indicates that the digital information has not been modified and access to the data file and/or subcontainer is allowed (block 745). Otherwise, access is prevented and perhaps an error is reported to an error log or the user (block 750).

The authentication of the provider of the digital container involves the recovery of the contents of a digital certificate that was supplied to the second platform either through a certification authority or directly from the vendor who intents to distribute the digital container. Normally, the recovered contents of a digital certificate include a public key of the provider and possibly the signatory. If all the message digests of the digital information can be accurately recovered & verified for integrity using the public key contained in the digital certificate, then the originator is authenticated.

Referring back to FIG. 7, once client application 610 issues a request to unpack digital container 150, container API 600 creates a hierarchical map of digital container 150 in main memory (see memory 130 of FIG. 1). This allows container API 600 to access data from nested digital containers through retrieval of information from the hierarchical map.

Container API 600 exports only the information pertaining to digital container 150 (e.g., content list, verification status, boot resource name, number of sub or nested containers etc.) to the application 610. In other words, the actual digital information 230 can never be accessed directly by the application 610. Instead, the application can access the actual digital information (after it has been verified and authenticated) indirectly through the use of a boot resource file (not shown) that is inside digital container 150 itself. For example, in one embodiment, the boot resource file could be an executable file used to install the software. Thus, second platform 160 will not allow application 610 to directly download or extract individual data files from digital container 150. Instead, application 610 indirectly accesses information from digital container 150 using the boot resource application (that is part of the digital container) which knows what operation is authorized and what to do with digital container 150.

One very useful aspect of container API 600 is its ability to navigate nested digital containers within a principal (or top level) digital container 150. For example, in one embodiment, a manufacturing vendor A can build many individual digital containers to distribute its products while a distributing or retailing vendor B can incorporate these individual digital containers as well as add their own digital information to build the principal or top level digital container for distribution. This allows digital containers to be nested thus providing a flexible and commercially viable model to distribute digital content.

In addition, container API 600 supports multi-threaded operations so that multiple client applications can operate on a single digital container and a single client application can operate on multiple digital containers. This makes container API 600 quite scalable from simple one-to-one relationship to one-to-many relationship between the first platform 110 and the second platform 160 correspondingly. This also provides economy of storage space when second platform 160 is serving one Digital Container 150 to large number of applications 610. The pseudo code for container API 600 is shown below in Table A.

TABLE A

| FUNCTION | DESCRIPTION |
| --- | --- |
| OpenContainer(CHAR * ContainerName, NULL Reserved) | This function is designed to open a container file. ContainerName is a null-terminated string being a handle of the container file. Upon successful completion in opening the container file, a non-negative number is returned. |
| Verify(CHAR * lpszCertFile, CHAR * lpszHumanName) | This function is designed to verify the integrity of a container file. For integrity verification, the argument lpszCertFile is NULL and for authenticity verification, the argument is a null-terminated string for a |

TABLE A-continued

| FUNCTION | DESCRIPTION |
| --- | --- |
|  | handle of an X509-based certificate. For integrity verification, the argument lpszHumanName is a NULL and for authenticity verification, the argument is a null-terminated human name string used for the signature file while signing the container manifest. Upon successful completion in verifying the integrity of a container file, a non-negative number is returned. |
| VerifyAndGetReferentInfo (CHAR * lpszCertFile, CHAR * lpszHumanName, unsigned int * NumReferentElements, CONT_REFERENT_INFO pReftrentList[ ]) | This atomic function, meaning that the returned information regarding the container data is based on the verification done as a result of this call and is independent of any previous verification, is designed to verify a container file and returns container information for each referent name, its verification status, and its signer certificate. For integrity verification, the argument lpszCertFile is NULL and for authenticity verification, the argument is a null-terminated string for a handle of an X509-based certificate. For integrity verification, the argument lpszHumanName is a NULL and for authenticity verification, the argument is a null-terminated human name string used for the signature file while signing the container manifest. On input, the argument NumReferentElements is the number of expected entities (files and URLs) in the container file. On return, the exact number of entities in the container file. The argument pReferentList is a pointer to the buffer which is of the size NumReferentElements * CONT_REFERENT_INFO. If the expected number of entities in the container file is equal to the exact number of entities, a non-negative number is returned. |
| GetBootResource(unsigned int NumCharElements, CHAR lpszBootResource[ ]) | This function is designed to obtain the boot strap resource file for the container. In one embodiment, the boot strap resource is a file that guides an application to operate on the digital container or it could be another exe which can operate on the data files or subcontainers themselves. Normally, there is only one bootstrap resource file for any digital container. The argument, NumCharElement indicates the number of character elements in lpszBootResource[ ] buffer. The typical size is 255 characters. The buffer lpszBootResource[ ] receives the full path of the bootstrap resource file for the container. Upon successful completion in opening the container file, a non-negative number is returned. |
| GetNumOfSubcontainers(unsigned int* NumSubContElements) | This function is designed to obtain the number of nested subcontainers in a digital container. The argument NumSubContElements is a pointer to an unsigned integer to receive the number of nested subcontainers. Upon successful completion in opening the container file, a non-negative number is returned. |
| GetSubcontainerList(unsigned int NumSubContElements, CONT_REFERENT_INFO pSubcontainerList[ ]) | This function is designed to obtain the list of nested subcontainers in a container. The parameter NumSubContElement is the exact number of nested subcontainers in a container file. Use GetNumOfSubcontainers() to obtain this number. The parameter pSubcontainerList[ ] is a pointer to the buffer which is of the size (NumSubContElement * CONT_REFERENT_INFO). Upon successful completion in opening the |

TABLE A-continued

| FUNCTION | DESCRIPTION |
| --- | --- |
|  | container file, a non-negative number is returned. |
| CloseContainer() | This function is designed to close a container file. Upon successful completion in closing the container file, a non-negative number is returned. |

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   producing a container archive by compressing a first combined result of (i) digital information including a plurality of data files and (ii) a signed archive manifest associated with the digital information, the signed archive manifest including (i) a message digest and an assigned handle associated with each data file of the plurality of data files, and (ii) a first digital signature; and
   producing a digital container by compressing a second combined result of the container archive and a signed container manifest associated with the container archive.

2. The method of claim 1, wherein the producing of the container archive includes performing a concatenation operation on the signed archive manifest and the digital information to produce the first combined result.

3. The method of claim 1, wherein the producing of the digital container includes performing a concatenation operation on the signed container manifest and the container archive to produce the second combined result.

4. The method of claim 1, wherein the act of compressing includes performing a zip operation.

5. The method of claim 1, wherein each data file of the plurality of data files being one of (i) a binary or executable file (ii) a text file including a uniform resource locator, (iii) a digital container file, (iv) any digital data in a file form.

6. The method of claim 1, wherein the first digital signature includes a resultant message digest being a result produced by performing a selected one-way hash function on a concatenation of the plurality of data files and digitally signing the result with a signatory key.

7. The method of claim 1, wherein the producing of the digital container includes
   producing the signed container manifest using the container archive;
   combining the signed container manifest and the container archive to produce the second combined result; and
   compressing the second combined result.

8. The method of claim 7, wherein the signed container manifest includes (i) a message digest and assigned handle associated with container archive file, and (ii) a second digital signature.

9. The method of claim 7, wherein the second digital signature includes a resultant message digest being a result produced by performing a selected one-way hash function on container archive and digitally signing the result with a signatory key.

10. A computer program loaded in a memory device for execution by a processor of a platform, the computer program comprising:
    a first program to produce security attributes of digital information including a plurality of data files, the security attributes including at least one message digest and a handle associated with each data file of the plurality of data files, a first digital certificate, and a first digital signature;
    a second program to combine and compress a result of the digital information and the security attributes of the digital information to produce a container archive;
    a third program to produce security attributes of the container archive including a message digest and a handle produced from the container archive, a second digital certificate and a second digital signature;
    a fourth program to combine and compress a result of the container archive and the security attributes of the container archive to produce a digital container.

11. The computer program of claim 10, wherein both the second and fourth programs perform a zip operation on the result.

12. The computer program of claim 10, wherein the digital information operated on by the first program includes a plurality of data files.

13. The computer program of claim 12, wherein each data file of the plurality of data files being one of (i) a binary or executable file (ii) a text file including a uniform resource locator, (iii) a digital container file, (iv) any digital data in a file form.

14. A platform comprising:
    a processor; and
    a memory device including code executable by the processor, the code (i) to produce a container archive by compressing a combined result of digital information including (a) a plurality of data files including at least two of an executable file, a text file including a uniform resource locator, and a digital container file and (b) a signed archive manifest associated with the digital information having a message digest associated with each of the at least two of the executable file, the text file and the digital container file and a handle associated with each message digest, and (ii) to compress a combination of a signed container manifest and the container archive forming a digital container.

15. The platform of claim 14, wherein the memory device includes a peripheral memory device digital information.

16. The platform of claim 14 further comprising a communication device to receive the digital information from a remote source.

\* \* \* \* \*

UNITED STATES PATENT AND TRADEMARK OFFICE
CERTIFICATE OF CORRECTION

PATENT NO. : 6,629,150 B1
DATED : September 30, 2003
INVENTOR(S) : Huded

It is certified that error appears in the above-identified patent and that said Letters Patent is hereby corrected as shown below:

Column 4,
Line 15, delete "$31_1$-$31_N$", insert -- $311_1$-$311_N$ --.

Signed and Sealed this

Sixteenth Day of December, 2003

JAMES E. ROGAN
*Director of the United States Patent and Trademark Office*